Figure 1:
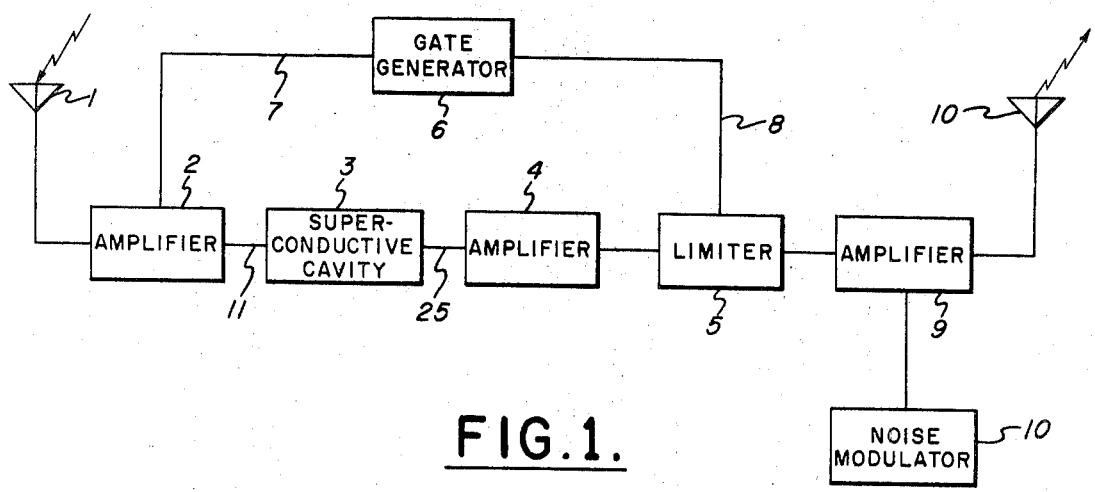

United States Patent Office 3,564,546
Patented Feb. 16, 1971

3,564,546
COUNTERMEASURES SYSTEM UTILIZING SUPERCONDUCTIVE FREQUENCY MEMORY DEVICE
Kay Howard Barney, Roslyn Heights, and Peter K. Shizume, Glen Oaks, N.Y., assignors to Sperry Rand Corporation, Great Neck, N.Y., a corporation of Delaware
Filed Aug. 10, 1959, Ser. No. 832,869
Int. Cl. G01s 7/42; H01p 7/06
U.S. Cl. 343—18                                10 Claims The present invention relates to the art of countermeasures and, more particularly, is concerned with a simplified and efficient countermeasures system utilizing a superconductive cavity resonator as a frequency memory device.

As is well understood, the effectiveness of enemy radar apparatus can be substantially neutralized by the countertransmission of interfering signals having substantially the same carrier frequency and signal spectrum as the enemy radar signals. Prior art techniques have been developed for performing spectrum analysis of received victim radar signals in order to generate a countermeasures signal having similar frequency characteristics. The greater the fidelity of reproduction of the enemy signal by the countermeasures apparatus, the more effective the countering signal will be in interfering with and thus rendering ineffectual the normal operation of the victim radar.

Such prior techniques have left much to be desired for several reasons. Spectrum analysis of received signals is time consuming. Additionally, the complexity of the analyzing equipment increases rapidly with the degree of frequency resolution desired. Furthermore, peak efficiency of the countermeasures equipment is difficult to achieve because this is realized only when maximum available energy is concentrated into the particular frequency spectrum occupied by the victim radar transmission.

One previously proposed solution to the problem of producing an effective countermeasure signal provides for a relatively great plurality of discretely tuned band pass filters, each covering adjacent portions of the signal spectrum. The approximate frequency content of the received enemy radar signal is determined by noting which of the band pass filters are energized by the received signal. Means responsive to each energized filter then determines the frequency content of the countertransmission. In order that the number of adjacent tuned band pass filters be kept within practical bounds, it was necessary to compromise somewhat the frequency resolution afforded by the filters. That is, the particular band pass of each of the tuned filters necessarily was broadened so that a practical number of filters could be employed to analyze the entire frequency range in which the enemy radar transmissions were expected to be present.

In accordance with the present invention, a necessity for the plurality of discretely tuned band pass filters is eliminated. At the same time, the frequency spectrum of the countering signal substantially duplicates that of the received victim radar signal with no appreciable portion of the available energy being diverted unnecessarily outside the frequency range occupied by the victim signal.

It is the principal object of the present invention to provide a simplified and efficient countermeasure apparatus.

Another object is to provide in a countermeasures system substantially instantaneously responsive means for reproducing the frequency content of a received radar signal.

A further object is to direct all available countermeasure transmitter energy into the frequency spectrum occupied by victim radar signal transmissions.

These and other objects of the present invention, as will apepar more fully upon a reading of the following specification, are achieved in a preferred embodiment by the provision of a radar countermeasure apparatus embodying a superconductive microwave resonant cavity. The countermeasures equipment includes means for receiving incident victim radar signals and for applying the same to the input of the superconductive cavity. The cavity is shock-excited into sustained oscillation at frequencies corresponding to those contained in the received signal. The oscillations are then extracted from the cavity and, after suitable amplification and optional modulation, are transmitted back to the victim radar. Means are provided for maintaining the temperature of the microwave resonant cavity near absolute zero whereby the oscillations excited therein are sustained for relatively long periods of time at least of the order of the repetition interval of the enemy radar.

Figure 2:
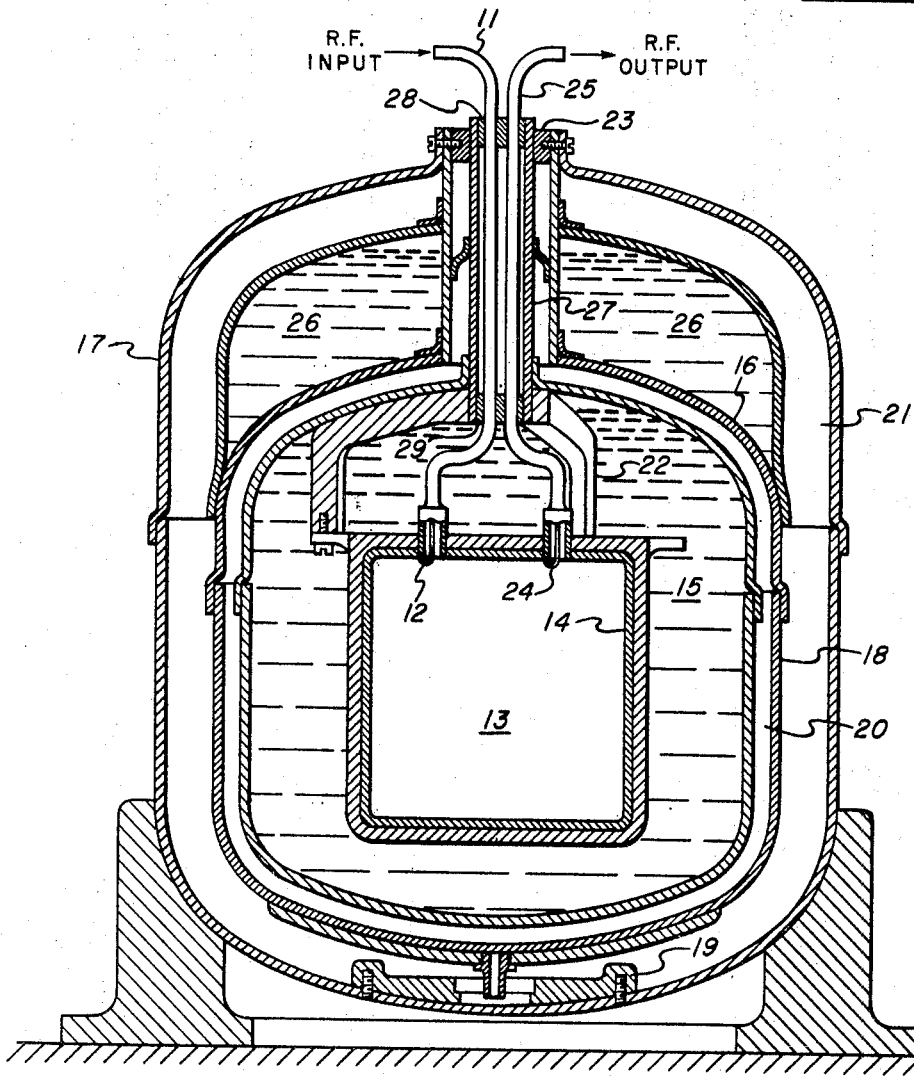

For a more complete understanding of the present invention, reference should be had to the following specification and to the appended drawing of which:

FIG. 1 is a simplified block diagram of a preferred embodiment of the present invention; and FIG. 2 is a cross-sectional view of a representative superconductive microwave resonant cavity useful in the embodiment of FIG. 1.

Referring to FIG. 1, enemy radar signals received by antenna 1 are amplified in amplifier 2 and then applied to the input of superconductive cavity 3. Cavity 3 is shock-excited into sustained oscillations at frequencies corresponding to those contained in the received radar signal. The oscillations present in cavity 3 are coupled out and applied by amplifier 4 to limiter 5.

Amplifier 2 and limiter 5 are rendered operative at mutually exclusive times by gate generator 6. Generator 6 may comprise, for example, a free-running multivibrator producing two output signals on lines 7 and 8 which occur in time opposition. Thus, amplifier 2 is rendered operative at the same time that limiter 5 is rendered inoperative and vice versa. The amplitude limited signal at the output of limiter 5 is applied to amplifier 9, a second input to which is derived from modulator 10. The modulated signal at the output of amplifier 9 is then radiated back to the victim radar via transmitting antenna 10.

An illustrative embodiment of superconductive cavity 3 is shown in the cross-sectional view of FIG. 2. The signals present at the output of amplifier 2 of FIG. 1 are applied via coaxial line 11 and coupled by loop 12 into resonant cavity 13. The walls of cavity 13 preferably are lined with a pure layer 14 of a material such as lead or tin which exhibits superconductive properties near absolute zero (0° Kelvin). The "transition temperature" below which such materials exhibit superconductive properties varies with and is characteristic of the particular superconducting material used. At temperatures below the transition temperature, the direct current resistivity of the material abruptly drops from its ordinary finite value to essentially zero resistivity. This abrupt and marked reduction of resistivity occurs within a temperature increment of a few hundredths of a degree Kelvin about the transition temperature. The surface resistance of cavity 13 to microwave frequencies has been found to fall to a very small fraction of its usual value at ordinary temperatures. This very substantial decrease in surface resistance imparts an extraordinarily high Q of the order of several million to the resonant cavity.

In the representative embodiment, cavity 13 is approximately cubical in shape. Its three dimensions preferably are made slightly unequal so that a maximum number of modes of oscillation will be supported by the cavity in the operating bandwidth of the countermeasures system. Such dimensioning of the resonant cavity is well known in the art and is disclosed, for example, in U.S. Pat. 2,539,511 issued on Jan. 30, 1951 to W. W. Hansen et al., and assigned to the present assignee.

Cavity 13 with its lined superconductive walls 14 are maintained below the transition temperature by immersing the cavity in a bath of liquid helium 15. The liquid helium is contained within double-walled flask 16 which is supported by structural member 19 within an outer flask 17. Flask 17 is also of double-walled construction and shares a wall portion 18 commonly with flask 16. The space at the top between flasks 16 and 17 is filled with liquid nitrogen which, with evacuated and insulated spaces 20 and 21 of double-walled flasks 16 and 17, assists in maintaining the liquefied state of the helium. Liquid helium at atmospheric pressure is at a temperature below the transition temperature of the lead-lined walls 14 of cavity 13. Suitable filling and venting ports for the liquid helium and nitrogen are provided as is well known in the art but have been omitted from the drawing for the sake of simplicity and clarity.

Cavity 13 is supported within flask 16 by yoke assembly 22 which, in turn, is fastened to the common neck 27 of flasks 16 and 17. Insulating member 23 seals the end of double-walled neck 27. Insulating members 28 and 29 further aid in supporting cavity 13 while permitting the ingress and exit of coaxial lines 11 and 25. Microwave energy is coupled out of cavity 13 by conductive loop 24 and coaxial cable 25.

In operation, a received enemy radar signal within the band pass of cavity 3 shock excites the superconductive cavity into oscillation in a large number of non-degenerate modes determined by the frequency content of the received signal and the dimensions of the cavity. In a representative case, where the dimensions of cavity 13 are 11 x 12 x 13 inches, the mode density of the cavity would be approximately one mode per ½ megacycle within a band pass frequency range of 8-12 kilomegacycles. The energy level of the oscillations present in cavity 13 will increase rapidly during the occurrence of the received enemy signals. Of course, the energy level will begin to decrease upon the termination of the received signal but because of the very substantial Q of the superconductive cavity, the oscillations will decay very slowly. They will persist at substantial amplitude for relatively long time duration of the order of several milliseconds which corresponds to the longest pulse repetition interval conventionally utilized by radars.

The oscillations within cavity 13 are coupled out and applied via coaxial line 25 to amplifier 4. After suitable amplification in amplifier 4, the signals are applied to limiting amplifier 5 wherein the decay modulation of the frequency memory superconductive cavity is removed. The output of limiter 5 preferably is modulated in amplifier 9 with interfering signals such as generated by noise modulator 10. The modulated signal at the output of amplifier 9 is radiated by antenna 10 back to the victim radar.

In the event that sufficient isolation cannot be achieved between receiving antenna 1 and transmitting antenna 10, gate generator 6 can be used to prevent oscillation of the system by its previously described alternative energization of amplifier 2 and limiter 5. The gating action afforded by generator 6 may be carried out at a frequency of several megacycles per second. Where sufficient isolation can be maintained between antennas 1 and 10 by ordinary design techniques, the need for generator 6 is obviated.

It will be seen that the objects of the present invention have been achieved through the use of a superconductive resonant cavity as substantially instantaneous frequency memory device in a countermeasures system. Although modulator 10 has been described in connection with the illustrative embodiment as comprising a source of noise-like signals for modulating the amplitude of the signals transmitted back to the victim radar, it will be understood that the nature of modulator 10 may be varied to effectively cope with different specific types of enemy radar and for different tactical purposes. Moreover, use of the countermeasures system of the present invention is not limited to the illustrative case of an enemy radar. For example, the countermeasures system will also effectively cope with pulsed communication signals, IFF and telemetering signals.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In a countermeasures system adapted to receive pulsed microwave signals, means for substantially instantaneously producing an interfering signal of substantially the same frequency content as that of the received signals, said means comprising a superconductive cavity resonator, and means for maintaining said cavity resonator at a temperature below the superconductive transition temperature.

2. In a radar countermeasures system adapted to receive pulsed microwave signals emitted by victim radars, means for substantially instantaneously producing for transmission back to said victim radar an interfering signal of substantially the same frequency characteristic as that of the received signals, said means comprising a superconductive cavity resonator, and means for maintaining said cavity resonator at a temperature below the superconductive transition temperature.

3. Apparatus as defined in claim 2 wherein the walls of said superconductive cavity resonator are lined with a pure layer of superconductive material.

4. Apparatus as defined in claim 3 wherein said superconductive material is lead.

5. Apparatus as defined in claim 2 wherein said means for maintaining said cavity resonator comprises a flask of liquid helium for immersing said cavity resonator.

6. Apparatus as defined in claim 2 wherein said cavity resonator is dimensioned so as to support a multiplicity of modes of oscillation within the frequency spectrum of said received signals.

7. Apparatus as defined in claim 6 wherein said dimensioned cavity resonator is approximately cubical in shape.

8. A countermeasures system comprising means for receiving pulsed microwave signals emitted by a victim radar, a superconductive resonant cavity coupled to said means for receiving, said cavity being dimensioned so as to support a multiplicity of modes of oscillation within the frequency spectrum of the victim radar signals, means for maintaining the temperature of said resonant cavity below the superconductive transition temperature, and means for coupling out and transmitting back to the enemy radar the oscillations present in said resonant cavity.

9. Apparatus as defined in claim 8 wherein said means for coupling out and transmitting back includes signal amplitude limiting means.

10. A countermeasures system comprising means for receiving pulsed microwave signals emitted by a victim radar, a superconductive resonant cavity coupled to said means for receiving, means for maintaining the temperature of said resonant cavity below the superconductive transition temperature, transmitting means, means for coupling the output of said resonant cavity to said transmitting means, and means for rendering said receiving and transmitting means operative during mutually exclusive time intervals.

References Cited

UNITED STATES PATENTS 2,916,615  12/1959  Lundburg _____ 333—99

OTHER REFERENCES

Hewlett: Superconductivity, General Electric Review, June, 1946, pp. 19–25.

RODNEY D. BENNETT, Jr., Primary Examiner

M. F. HUBLER, Assistant Examiner

U.S. Cl. X.R.

333—83, 99